(12) United States Patent
Yamada et al.

(10) Patent No.: US 9,136,739 B2
(45) Date of Patent: Sep. 15, 2015

(54) ROTARY ELECTRIC MACHINE

(71) Applicant: HONDA MOTOR CO., LTD., Tokyo (JP)

(72) Inventors: Satoshi Yamada, Utsunomiya (JP); Koichi Ono, Utsunomiya (JP); Manabu Yazaki, Utsunomiya (JP); Tarou Genda, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/356,062

(22) PCT Filed: Nov. 16, 2012

(86) PCT No.: PCT/JP2012/079777
§ 371 (c)(1),
(2) Date: May 2, 2014

(87) PCT Pub. No.: WO2013/077264
PCT Pub. Date: May 30, 2013

(65) Prior Publication Data
US 2014/0319939 A1    Oct. 30, 2014

(30) Foreign Application Priority Data

Nov. 22, 2011  (JP) ................. 2011-255216

(51) Int. Cl.
| H02K 5/22 | (2006.01) |
| H02K 3/50 | (2006.01) |
| H02K 3/28 | (2006.01) |
| H02K 3/52 | (2006.01) |
| H02K 9/26 | (2006.01) |
| H02K 9/19 | (2006.01) |

(52) U.S. Cl.
CPC ............... *H02K 3/28* (2013.01); *H02K 3/522* (2013.01); *H02K 5/225* (2013.01); *H02K 9/26* (2013.01); *H02K 9/19* (2013.01); *H02K 2203/06* (2013.01)

(58) Field of Classification Search
CPC .......... H02K 3/28; H02K 5/225; H02K 5/22; H02K 11/046; H02K 11/044
USPC ........................................... 310/71
See application file for complete search history.

(56) References Cited

U.S. PATENT DOCUMENTS

| 7,834,498 | B2* | 11/2010 | Shiino et al. ............ 310/71 |
| 8,120,216 | B2* | 2/2012 | Sakata ................. 310/71 |
| 8,198,767 | B2* | 6/2012 | Migita et al. ........... 310/71 |
| 8,803,378 | B2* | 8/2014 | Sonohara et al. ........ 310/53 |
| 2010/0216332 | A1* | 8/2010 | Garriga et al. ......... 439/485 |
| 2010/0320853 | A1* | 12/2010 | Isogai et al. .......... 310/71 |

FOREIGN PATENT DOCUMENTS

| JP | 2004-242472 A | 8/2004 |
| JP | 2005-20953 A | 1/2005 |
| JP | 2006-340585 A | 12/2006 |

OTHER PUBLICATIONS

International Search Report dated Dec. 25, 2012 issued in corresponding application No. PCT/JP2012/079777.

* cited by examiner

*Primary Examiner* — Terrance Kenerly
(74) *Attorney, Agent, or Firm* — Westerman, Hattori, Daniels & Adrian, LLP

(57) ABSTRACT

A rotary electric machine includes a stator around which coil conductor wires for a plurality of phases are wound, a housing that contains the stator, and a terminal block that is mounted on the housing and connects end portions of the coil conductor wires for the respective phases led from the stator to corresponding external power supply lines. A coolant is supplied to the stator in the housing. The terminal block includes: a plurality of relay conductors, each relay conductor having one end connected to an external power supply line and the other end connected to an end portion of the coil conductor wires for 10 the respective phases, and a terminal block body that is made of an insulating material and holds the plurality of relay conductors.

15 Claims, 14 Drawing Sheets

ROTARY ELECTRIC MACHINE

TECHNICAL FIELD

The present invention relates to a rotary electric machine that is used for the drive of a vehicle, regenerative power generation, or the like.

Priority is claimed on Japanese Patent Application No. 2011-255216, filed Nov. 22, 2011, the content of which is incorporated herein by reference.

BACKGROUND ART

When a rotary electric machine, which is used for the drive of a vehicle, regenerative power generation, or the like, is used as a drive motor, alternating current flows through a plurality of coil conductor wires, which are wound around a stator, with a phase shift. For this reason, end portions of the coil conductor wires for the respective phases are tied at one point, and are connected to external power supply lines for the corresponding phases. The end portions of the coil conductor wires for the respective phases and the external power supply lines are generally connected to each other in a terminal block that is installed in a housing receiving the stator (for example, see Patent Document 1).

The terminal block is formed so that bus bars (relay conductors) of which the number is equal to the number of phases of the rotary electric machine are installed on a terminal block body, which is made of an insulating material such as an insulating resin, so as to be separated from each other. Further, an external power supply line is connected to one end of each bus bar, and the end portion of the coil conductor wire for each phase is connected to the other end of each bus bar.

PRIOR ART DOCUMENTS

Patent Documents

[Patent Document 1] Japanese Unexamined Patent Application, First Publication No. 2006-340585

DISCLOSURE OF INVENTION

Problems to be Solved by Invention

The inventors examined a rotary electric machine that maintains a state in which each connection portion is insulated by a simpler structure. That is, the inventors examined a rotary electric machine including: a terminal block that is installed close to the outer peripheral surface of a stator; a base wall that allows connection portions of the respective bus bars connected to coil conductor wires to be disposed on the terminal block body so as to be separated each other; an outer wall that is disposed between an inner wall of a housing of the rotary electric machine and the connection portions disposed on the base wall so as to be along an end edge of the base wall; and a plurality of partition walls that extend toward the base wall from the outer wall and insulate peripheral portions of the respective connection portions together with the outer wall.

According to the above-mentioned structure, it was found that a state in which each connection portion is insulated can be maintained by a simpler structure. However, when a coolant for cooling the stator enters the terminal block, the flow of the coolant is obstructed by the partition walls. Accordingly, a possibility that impurities mixed with the coolant are accumulated on the peripheral portions of the connection portions is considered. Further, when a large amount of impurities are accumulated on the peripheral portions of the connection portions, there is a concern that insulation between the adjacent connection portions deteriorates.

Accordingly, further examination has been made in consideration of the above-mentioned problem. The invention is to provide a rotary electric machine that can maintain an insulating property between connection portions disposed on a terminal block for a long period of time by preventing impurities mixed with a coolant from being accumulated around the connection portions disposed on the terminal block.

Means for Solving the Problems

A rotary electric machine according to the invention has employed the following structure to achieve an object by solving the above-mentioned problem.

(1) That is, a rotary electric machine according to an aspect of the invention includes a stator on which coil conductor wires for a plurality of phases are wound, a housing that contains the stator, and a terminal block that is mounted on the housing and connects end portions of the coil conductor wires for the respective phases led from the stator to corresponding external power supply lines. A coolant is supplied to the stator in the housing. The terminal block includes: a plurality of relay conductors, each relay conductor having one end connected to an external power supply line and the other end connected to an end portion of the coil conductor wires for the respective phases, and a terminal block body that is made of an insulating material and holds the plurality of relay conductors. The terminal block body includes: a base wall on which connection portions between the respective relay conductors and the end portions of the corresponding coil conductor wires are disposed so as to be separated from each other; an outer wall that is disposed between an inner wall of the housing and the connection portions disposed on the base wall so as to be along an end edge of the base wall; a plurality of partition walls that extend from the outer wall or the base wall and insulate peripheral portions of the connection portions together with the outer wall; a connection space portion that is surrounded by the base wall, the outer wall, and the plurality of partition walls and contains the connection portions; and slit through which the connection space portion communicates with the inner wall of the housing.

(2) In the rotary electric machine according to (1), the slit may be opened to the vertically lower side from the connection space portion.

(3) In the rotary electric machine according to (1) or (2), each of the relay conductors may include a plate-shaped portion that has a constant thickness smaller than the width of the slit, and the plate-shaped portion may be inserted into the slit in a direction orthogonal to a thickness direction.

(4) In the rotary electric machine according to (3), the plate-shaped portions may be provided with bent portions or curved portions.

(5) In the rotary electric machine according to (4), a direction in which the plate-shaped portion of one relay conductor among the plurality of relay conductors is inserted into the slit may be different from directions in which the plate-shaped portions of the other relay conductors are inserted into the corresponding slit.

(6) In the rotary electric machine according to (3), a direction in which the plate-shaped portion of one relay conductor among the plurality of relay conductors is inserted into the slit may be different from directions in which the plate-shaped portions of the other relay conductors are inserted into the corresponding slit.

(7) A rotary electric machine according to another aspect of the invention includes a stator on which coil conductor wires for a plurality of phases are wound, a housing that contains the stator, and a terminal block that is mounted on the housing and connects end portions of the coil conductor wires for the respective phases led from the stator to corresponding external power supply lines. A coolant is supplied to the stator in the housing. The terminal block includes: a plurality of relay conductors, each relay conductor having one end connected to an external power supply line and the other end connected to an end portion of the coil conductor wires for the respective phases, and a terminal block body that is made of an insulating material and holds the plurality of relay conductors. The terminal block body includes: a base wall on which connection portions between the respective relay conductors and the end portions of the corresponding coil conductor wires are disposed so as to be separated from each other; partition walls that are formed on the base wall so as to be provided upright in a direction crossing the base wall and partition the respective connection portions; and slit that includes insertion openings and conductor receiving portions, the relay conductors being inserted into the terminal block body from the outside of the terminal block body through the insertion openings, the conductor receiving portions being formed between the base wall and the partition walls.

(8) The rotary electric machine according to (7) may further include an outer wall that is disposed between an inner wall of the housing and the connection portions disposed on the base wall so as to be along an end edge of the base wall, and a connection space portion that is surrounded by the base wall, the outer wall, and the partition walls, and contains the connection portions. The slit may make the connection space portion communicate with the inner wall of the housing.

(9) In the rotary electric machine according to (7) or (8), the slit may be opened to the vertically lower side of the connection portions.

(10) In the rotary electric machine according to (9), each of the relay conductors may include a plate-shaped portion that has a constant thickness smaller than the width of the slit, and the plate-shaped portion may be inserted into the slit in a direction orthogonal to a thickness direction.

(11) In the rotary electric machine according to (7) or (8), each of the relay conductors may include a plate-shaped portion that has a constant thickness smaller than the width of the slit, and the plate-shaped portion may be inserted into the slit in a direction orthogonal to a thickness direction.

(12) In the rotary electric machine according to (11), the plate-shaped portions may be provided with bent portions or curved portions.

(13) In the rotary electric machine according to (10), the plate-shaped portions may be provided with bent portions or curved portions.

(14) In the rotary electric machine according to (7) or (8), the conductor receiving portion may include a portion of which the width is larger than the thickness of the relay conductor.

(15) In the rotary electric machine according to (9), the conductor receiving portion may include a portion of which the width is larger than the thickness of the relay conductor.

Effects of the Invention

According to (1), connection portions, which are to be connected to the coil conductor wires, of the respective relay conductors, which are disposed on the base wall, are surrounded by the base wall, the outer wall, and the partition walls. Accordingly, it is possible to maintain a state in which the connection portions are insulated from the surroundings. Moreover, it is possible to discharge a coolant, which enters the inside of the terminal block, to the inner wall of the housing from a connection space portion, which is formed in the terminal block, through the slit. For this reason, it is possible to prevent impurities, which are mixed with the coolant, from being accumulated around the connection portions that are disposed on the terminal block. As a result, it is possible to maintain an insulating property between the connection portions, which are disposed on the terminal block, for a long period of time.

According to (2), since the coolant, which flows into the connection space portion and contains impurities, flows into the slit by gravity, it is possible to more effectively suppress the accumulation of the impurities around the connection portion.

According to (3), each of the relay conductors includes a plate-shaped portion that has a substantially constant thickness smaller than the width of the slit, and the plate-shaped portion is inserted into the slit in a direction almost orthogonal to a thickness direction. Accordingly, gaps are formed between the plate-shaped portions and slit forming portions. Further, the coolant, which flows into the terminal block, or impurities mixed with the coolant, can be reliably discharged to the inner wall of the housing through the gaps.

Furthermore, even though relative displacement according to temperature change occurs between the relay conductors and the terminal block body due to a difference between the coefficient of linear expansion of the relay conductors and the coefficient of linear expansion of the terminal block body, it is possible to reliably absorb the relative displacement by the gaps between the respective plate-shaped portions and the slit forming portions. Accordingly, it is possible to prevent unnecessary stress from being generated in the terminal block body.

According to (4), while the plate-shaped portions are formed in a shape, which has a high degree of freedom according to the shapes or layout of other parts such as the housing, by the bent portions or the curved portions, it is possible to prevent large stress from being generated in the terminal block body at the time of a temperature change.

According to (5) or (6), a direction in which the plate-shaped portion of one relay conductor is inserted into the slit is different from directions in which the plate-shaped portions of the other relay conductors are inserted into the corresponding slit. For this reason, the connection portion of the one relay conductor can be easily set to substantially the same height as the connection portion of at least the other relay conductor on the base wall.

According to (7), the connection portions, which are to be connected to the coil conductor wires, of the respective relay conductors, which are disposed on the base wall, are disposed so as to be separated from each other, and are partitioned by the partition walls that stand in the direction crossing the base wall. Accordingly, it is possible to maintain a state in which the connection portions are insulated.

According to (8), it is possible to discharge a coolant, which enters the inside of the terminal block, to the inner wall of the housing from the connection space portion, which is formed in the terminal block, through the slit. For this reason, it is possible to prevent impurities, which are mixed with the coolant, from being accumulated around the connection portions that are disposed on the terminal block. As a result, it is possible to maintain an insulating property between the connection portions, which are disposed on the terminal block, for a long period of time.

According to (9), since the coolant, which flows into the connection space portion and contains impurities, flows into the slit by gravity, it is possible to more effectively suppress the accumulation of the impurities around the connection portion.

According to (10) or (11), each of the relay conductors includes a plate-shaped portion that has a substantially constant thickness smaller than the width of the slit, and the plate-shaped portion is inserted into the slit in a direction almost orthogonal to a thickness direction. Accordingly, gaps are formed between the plate-shaped portions and slit forming portions. Further, the coolant, which flows into the terminal block, or impurities mixed with the coolant can be reliably discharged to the inner wall of the housing through the gaps.

Furthermore, even though relative displacement according to temperature change occurs between the relay conductors and the terminal block body due to a difference between the coefficient of linear expansion of the relay conductors and the coefficient of linear expansion of the terminal block body, it is possible to reliably absorb the relative displacement by the gaps between the respective plate-shaped portions and the slit forming portions. Accordingly, it is possible to prevent unnecessary stress from being generated in the terminal block body.

According to (12) or (13), while the plate-shaped portions are formed in a shape, which has a high degree of freedom according to the shapes or layout of other parts such as the housing, by the bent portions or the curved portions, it is possible to prevent large stress from being generated in the terminal block body at the time of a temperature change.

According to (14) or (15), gaps are formed between the conductor receiving portions and the relay conductors. Further, the coolant, which flows into the terminal block, or impurities mixed with the coolant can be reliably discharged to the inner wall of the housing through the gaps.

Furthermore, even though relative displacement according to temperature change occurs between the relay conductors and the terminal block body due to a difference between the coefficient of linear expansion of the relay conductors and the coefficient of linear expansion of the terminal block body, it is possible to reliably absorb the relative displacement by the gaps between the conductor receiving portions and the relay conductors. Accordingly, it is possible to prevent unnecessary stress from being generated in the terminal block body.

EMBODIMENTS FOR CARRYING OUT THE INVENTION

Figure 1:
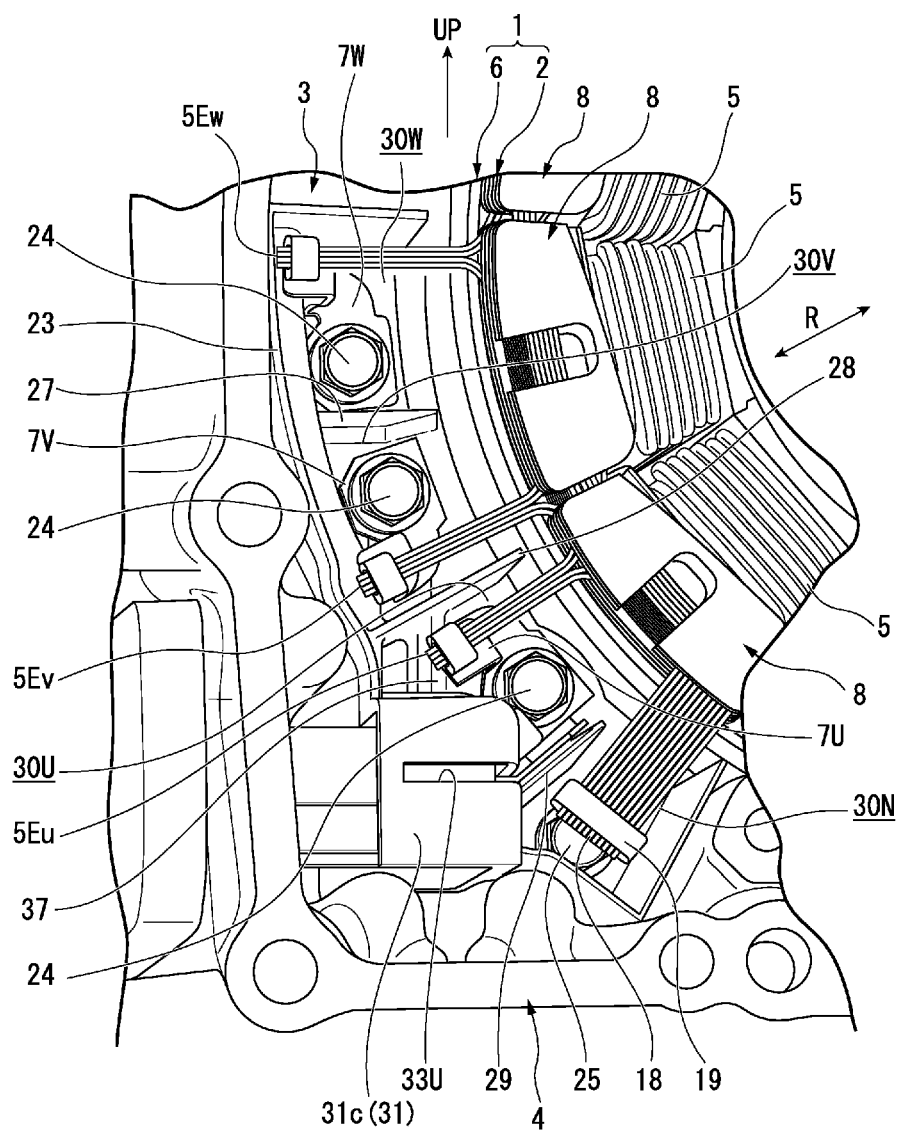
FIG. 1 is a front view of a part of a rotary electric machine according to an embodiment of the invention.

An embodiment of the invention will be described below with reference to the drawings. Meanwhile, in the drawings, an arrow UP represents a direction that corresponds to the vertically upper side when a rotary electric machine is mounted on a vehicle, the direction of an arrow Ax is a direction parallel to the axis of the rotary electric machine (axial direction), and the direction of an arrow R is a direction parallel to the radial direction of the rotary electric machine (radial direction).

FIG. 1 is a front view showing a part of a rotary electric machine according to this embodiment.

The rotary electric machine according to this embodiment is a three-phase AC rotary electric machine that is used for the drive and regenerative power generation of an electric automobile or a hybrid vehicle, and a rotor (not shown) is rotatably disposed in an annular stator 1. The rotor is connected to an axle of a vehicle through a speed reduction mechanism or the like.

The stator 1 includes an annular stator core 2 in which a plurality of coil conductor wires 5 are mounted with salient pole concentrated winding, and a substantially cylindrical holder 6 into which the stator core 2 is press-fitted. Further, in the stator 1, power supply terminals 7U, 7V, and 7W for the corresponding phases are connected to power supply-side end portions of coil conductor wires 5 for a U phase, a V phase, and a W phase that are led from the stator core 2 to the outside of the holder 6 in the radial direction, respectively.

In this embodiment, a rectangular wire having a horizontally long rectangular cross-section is employed as the coil conductor wire 5.

A plurality of split core pieces 8, which has substantially the shape of a fan in a front view, are annularly assembled, so that the stator core 2 is formed. The coil conductor wires 5 are individually wound around the respective split core pieces 8. One ends of the respective coil conductor wires 5, which are wound around the split core pieces 8, are collected for each phase and are connected to the power supply terminals 7U, 7V, and 7W for the corresponding phases. All of the other ends of the respective coil conductor wires 5 are collected at one point and are electrically connected to each other as a midpoint connecting portion 18. Accordingly, in the stator core 2, the coil conductor wires 5 for the respective phases are connected by Y-connection.

Power supply-side connection ends 5Eu, 5Ev, and 5Ew of the coil conductor wires 5 that are collected at a point for a U phase, a point for a V phase, and a point for a W phase and the midpoint connecting portion 18 of the coil conductor wires 5 that are connected at one point likewise are led from a specific region of a part of the outer periphery of the stator 1 to the outside of the stator 1 in the radial direction. Specifically, the connection ends 5Eu, 5Ev, and 5Ew and the midpoint connecting portion 18 are led from the outer peripheral regions of two specific split core pieces 8, which are adjacent to each other, to the outside in the radial direction. In FIG. 1, reference numeral 19 denotes a metal binding plate that holds the coil conductor wires 5 forming the midpoint connecting portion 18 and is connected to the respective coil conductor wires 5 by fusing.

The stator 1, which is formed as described above, is fixed and installed in a metal housing 4 together with a terminal block 3 that connects the power supply terminals 7U, 7V, and 7W to external power supply lines. A corner portion having a substantially L-shaped cross-section is formed at the lower end of the housing 4, and the terminal block 3 is disposed near the corner portion in the housing 4.

Figure 2:
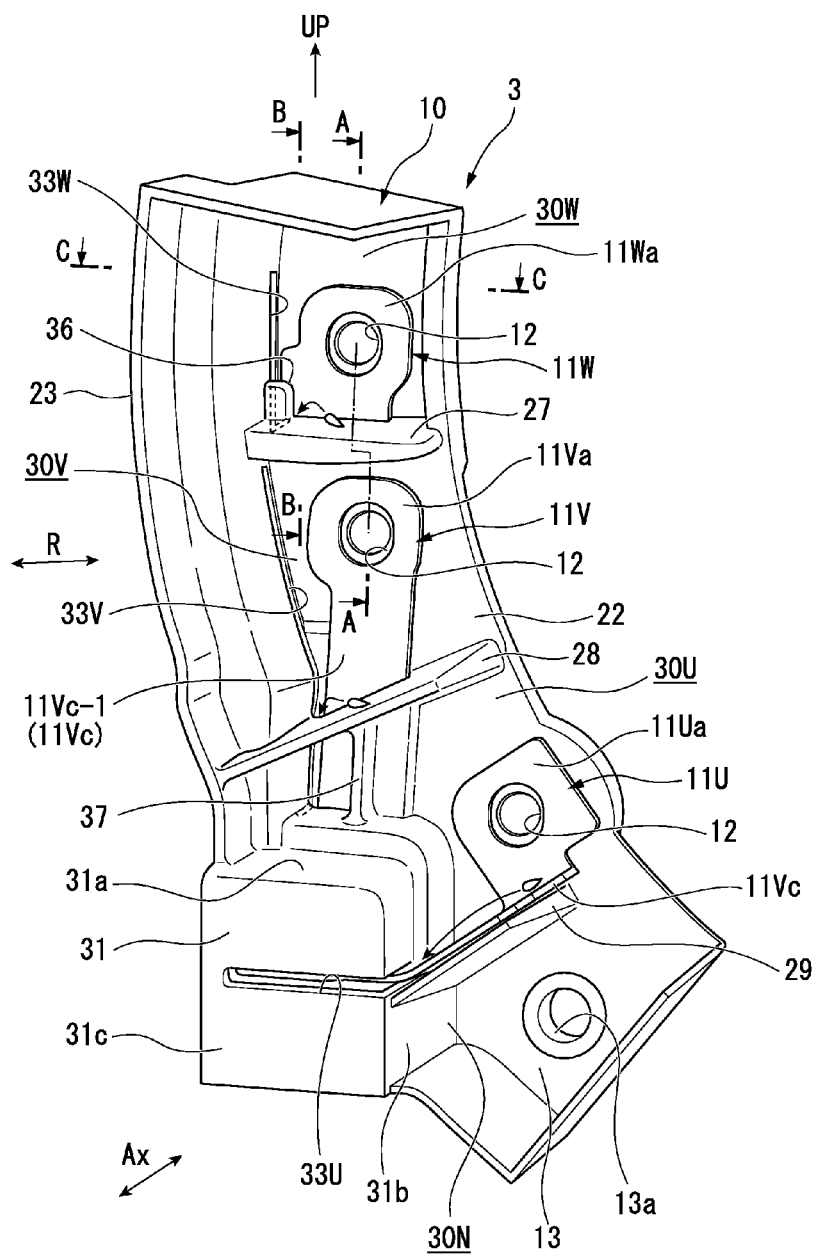
FIG. 2 is a perspective view of a terminal block used in the rotary electric machine according to the embodiment of the invention as viewed obliquely from above on the front side.
Figure 3:
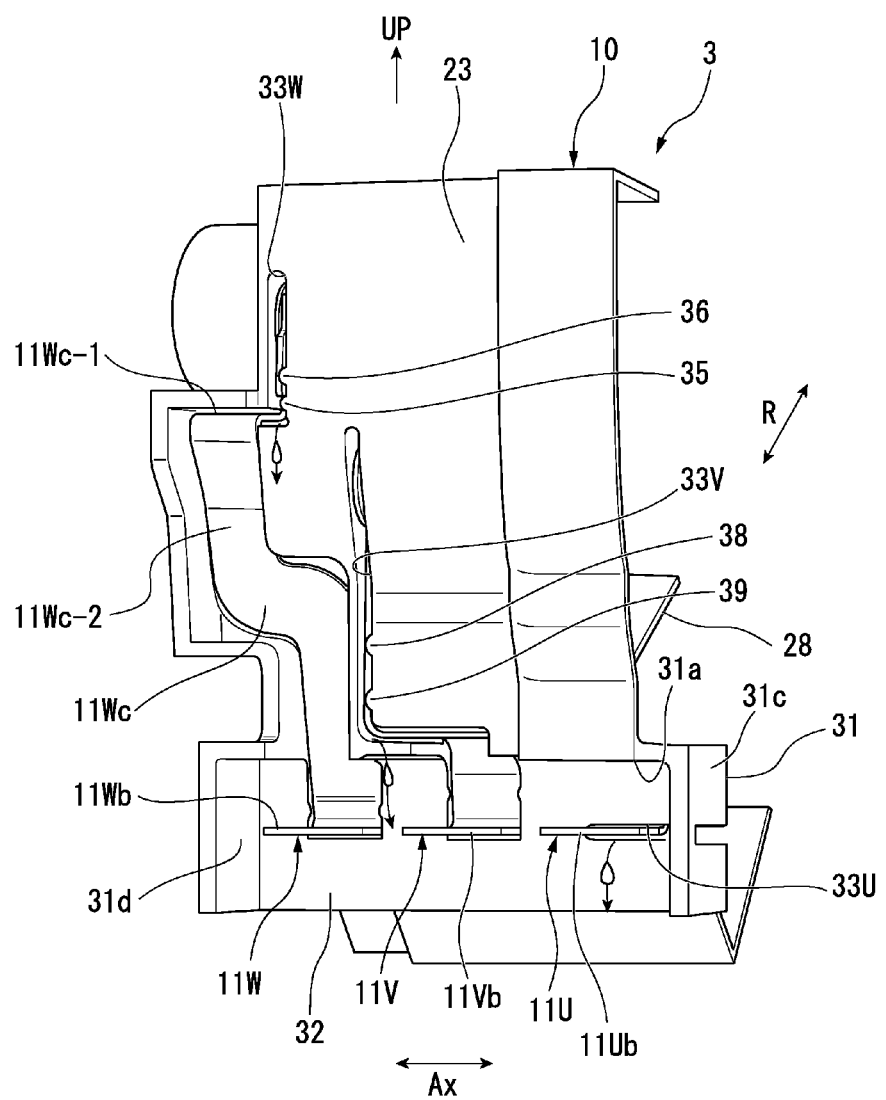
FIG. 3 is a perspective view of the terminal block of the rotary electric machine according to the embodiment of the invention as viewed obliquely from above on the left side of FIG. 2.
Figure 4:
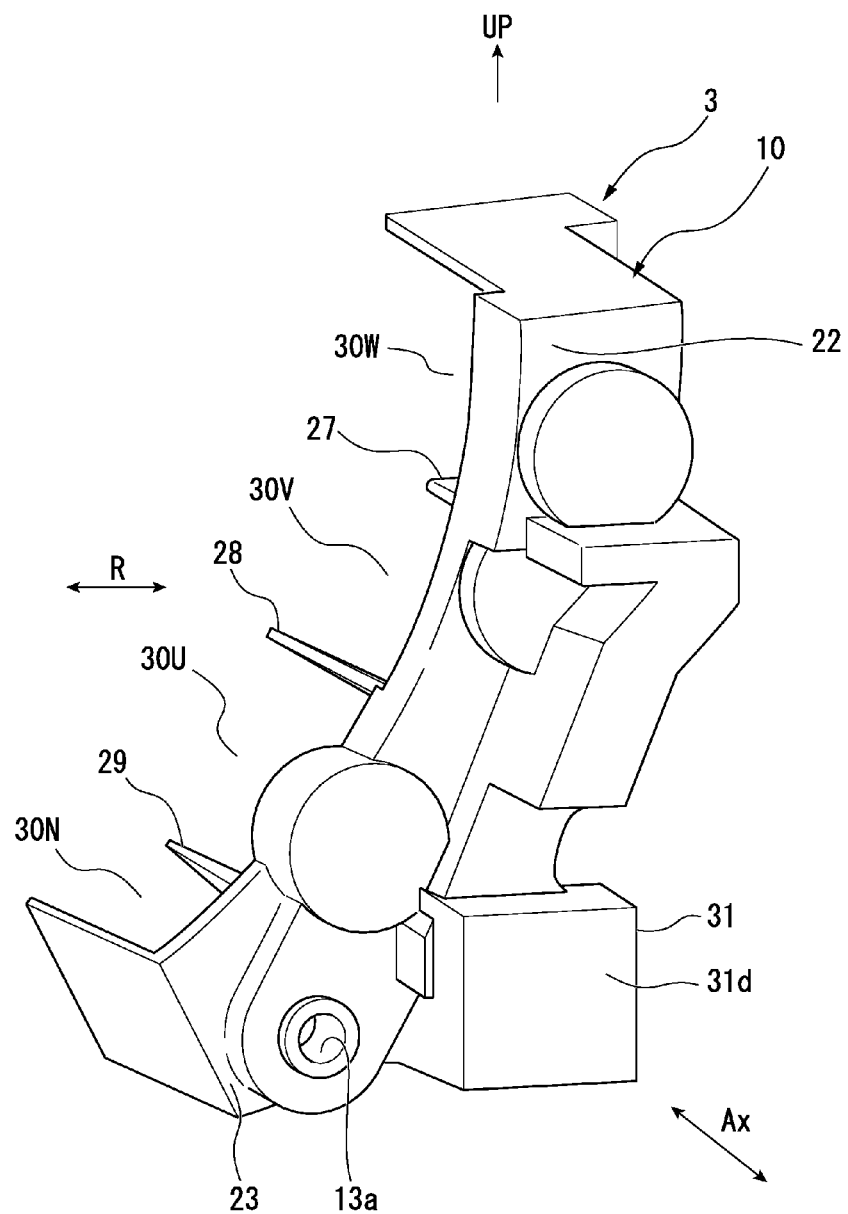
FIG. 4 is a perspective view of the terminal block of the rotary electric machine according to the embodiment of the invention as viewed from the back side.

FIGS. 2 to 4 are views showing the appearance of the entire terminal block 3.

As shown in FIGS. 2 to 4, the terminal block 3 includes a terminal block body 10 that is made of an insulating resin material and bus bars 11U, 11V, and 11W (relay conductors) for three phases, that is, a U phase, a V phase, and a W phase that are held by the terminal block body 10. Each of the bus bars 11U, 11V, and 11W is formed of a conductive metal plate that has a substantially constant thickness as a whole.

The terminal block body 10 includes an arc-shaped base wall 22 that extends in a direction substantially orthogonal to the axis of the stator 1, and an outer wall 23 that surrounds three sides except for the arc-shaped inner peripheral side of the base wall 22. The inner peripheral side of the base wall 22 on which the outer wall 23 is not present is formed so as to face the outer peripheral surface of the stator 1 (holder 6). Accordingly, while the terminal block 3 is fixed and installed in the housing 4 together with the stator 1, the terminal block body 10 forms a recessed space that is surrounded by the base wall 22, the outer wall 23, and the outer peripheral surface of the stator 1.

Here, when the surface, from which the outer wall 23 protrudes, of the base wall 22 of the terminal block body 10 is called the front surface, connection portions 11Ua, 11Va, and 11Wa, which are to be connected to the corresponding coil conductor wires 5, of the bus bars 11U, 11V, and 11W for three phases, that is, a U phase, a V phase, and a W phase, are disposed on the front surface of the base wall 22 so as to be separated from each other in an arc direction. Reference numeral 12 of FIG. 2 denotes bolt insertion holes that are formed at the connection portions 11Ua, 11Va, and 11Wa of the respective bus bars 11U, 11V, and 11W.

In this embodiment, the respective connection portions 11Ua, 11Va, and 11Wa are arranged side by side in the order of U, V, and W toward the upper side from the lower side as shown in FIG. 2, and a bolt fastening portion 13, which is used to join the terminal block 3 (terminal block body 10) to the housing 4, is formed at a position substantially directly below the lowermost connection portion 11Ua, which is disposed on the base wall 22, in a vertical direction. Reference numeral 13a of FIG. 2 denotes a bolt insertion hole into which a fastening bolt 25 shown in FIG. 1 is inserted. Further, reference numeral 24 of FIG. 1 denotes bolts that join the power supply terminals 7U, 7V, and 7W of the coil conductor wires 5 to the respective corresponding connection portions 11Ua, 11Va, and 11Wa.

The front surface of the base wall 22 of the terminal block body 10 is provided with a first partition wall 27 that partitions the connection portion 11Wa for a W phase and the connection portion 11Va for a V phase, a second partition wall 28 that partitions the connection portion 11Va for a V phase and the connection portion 11Ua for a U phase, and a third partition wall 29 that partitions the connection portion 11Ua for a U phase and the bolt fastening portion 13. The first to third partition walls 27 to 29 extend toward the base wall 22 from the positions that are separated from each other in the arc direction of the outer wall 23. More exactly, when the terminal block 3 is fixed in the housing 4 together with the stator 1, these partition walls 27, 28, and 29 extend in a direction (R direction) substantially directed to the axis of the stator 1, and the extending regions are connected to the base wall 22.

The first partition wall 27 forms an insulation space 30W of a W-phase connection portion by surrounding the connection portion 11Wa for a W phase together with the base wall 22 and an upper end region of the outer wall 23. Also, the first partition wall 27 and the second partition wall 28 form an insulation space 30V of a V-phase connection portion by surrounding the connection portion 11Va for a V phase together with the base wall 22 and an intermediate region of the outer wall 23. Furthermore, the second partition wall 28 and the third partition wall 29 form an insulation space 30U of a U-phase connection portion by surrounding the connection portion 11Ua for a U phase together with the base wall 22 and a lower intermediate region of the outer wall 23.

Further, the third partition wall 29 forms an insulation space 30N by surrounding the bolt fastening portion 13 together with the base wall 22 and a lower end region of the outer wall 23. As shown in FIG. 1, the midpoint connecting portion 18, which protrudes from the stator 1 to the outside in the radial direction, is inserted into the insulation space 30N so as to be separated from a head portion of the bolt 25 of the bolt fastening portion 13 in the axial direction Ax. Accordingly, the midpoint connecting portion 18 is electrically insulated from the connection portion 11Ua for a U phase and the housing 4, which are adjacent to the midpoint connecting portion 18, by the third partition wall 29 and the outer wall 23.

A substantially box-shaped connector connecting portion 31 is formed in an intermediate region near the lower portion of the outer wall 23 of the terminal block body 10 so that a part of the connector connecting portion 31 swells into the insulation space 30U for a U phase. The connector connecting portion 31 includes a box upper wall 31a and a box side wall 31b (see FIG. 2) that form a part of the intermediate region of the outer wall 23, and box end walls 31c and 31d (see FIGS. 3 and 4) that close both end faces of the box upper wall 31a and the box side wall 31b. A region that corresponds to a wall facing the box upper wall 31a of six surfaces of a box shape and a region that corresponds to a wall facing the box side wall 31b are successively opened. As shown in FIG. 3, the connector connecting portion 31 forms a recessed portion 32 at a lower end of the outer surface of the outer wall 23 by the box upper wall 31a, the box side wall 31b, and the box end walls 31c and 31d that are formed on both sides. In this embodiment, the substantially box-shaped connector connecting portion 31 forms a part of the outer wall 23.

In the recessed portion 32 of the connector connecting portion 31, connection portions 11Ub 11Vb, and 11Wb, which are to be connected to the power supply lines, of the above-mentioned bus bars 11U, 11V, and 11W for three phases are installed side by side in a line along the axial direction Ax.

Figure 5:
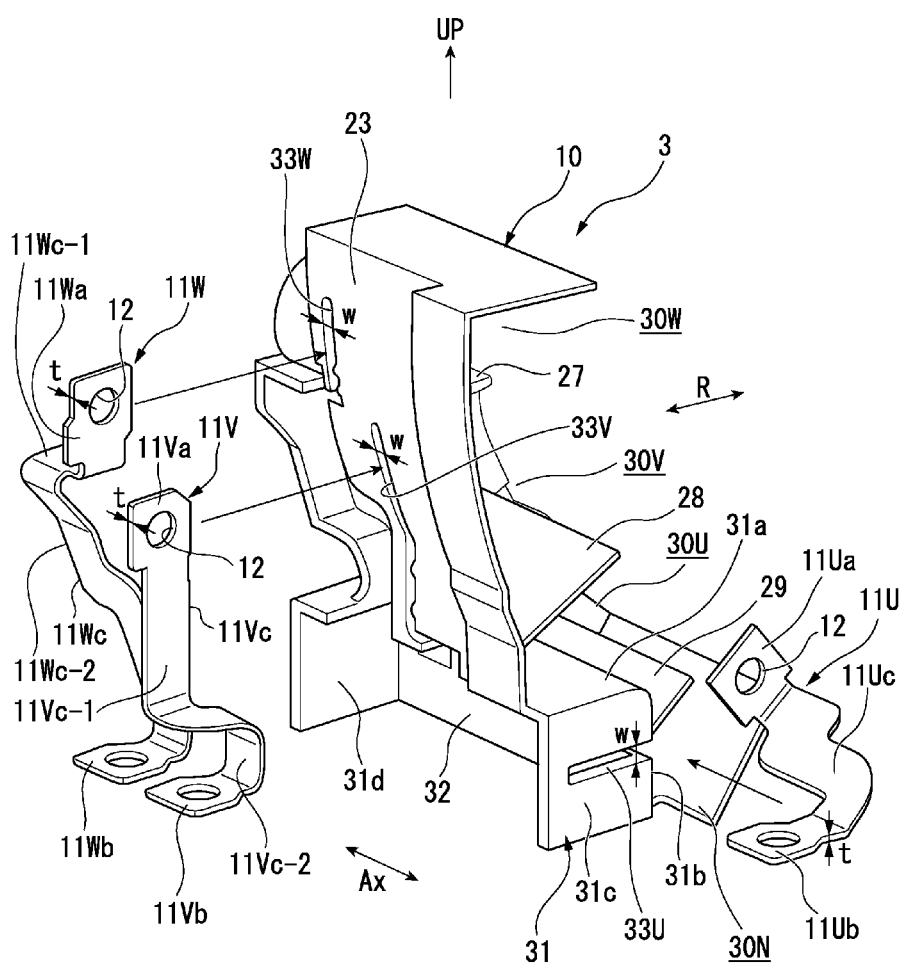
FIG. 5 is an exploded perspective view of the terminal block that is used to describe the assembly of bus bars (relay conductors) of the terminal block of the rotary electric machine according to the embodiment of the invention.

FIG. 5 is a view showing the shape of each of the bus bars 11U, 11V, and 11W and a state in which the bus bars 11U, 11V, and 11W are assembled with the terminal block body 10.

As shown in FIG. 5, each of the connection portions 11Ua, 11Va, and 11Wa close to the coils and the connection portions 11Ub, 11Vb, and 11Wb close to the power supply lines of the respective bus bars 11U, 11V, and 11W is formed of a flat wall, and the connection portions 11Ua, 11Va, and 11Wa are connected to the connection portions 11Ub, 11Vb, and 11Wb by bent connection walls 11Uc, 11Vc, and 11Wc, respectively.

The respective connection portions 11Ua, 11Va, and 11Wa close to the coils are disposed in a vertical attitude in the corresponding insulation spaces 30U, 30V, and 30W so as to be along the front surface of the base wall 22. Also, the connection portions 11Ub, 11Vb, and 11Wb close to the power supply lines are disposed in a horizontal attitude in the recessed portion 32 of the connector connecting portion 31 so as to be along the lower surface of the box upper wall 31a.

The respective connection portions 11Ua, 11Va, and 11Wa close to the coils and a part of the connection walls 11Uc, 11Vc, and 11Wc of the respective bus bars 11U, 11V, and 11W are inserted into the inside of the terminal block body 10 (the side where the insulation spaces 30U, 30V, and 30W are present) through slits 33U, 33V, and 33W that are formed at the outer wall 23 of the terminal block body 10.

Here, details of the respective bus bars 11U, 11V, and 11W and the corresponding slits 33U, 33V, and 33W will be described.

First, the bus bar 11W and the slit 33W for a W phase and the bus bar 11V and the slit 33V for a V phase will be described.

Figure 6:
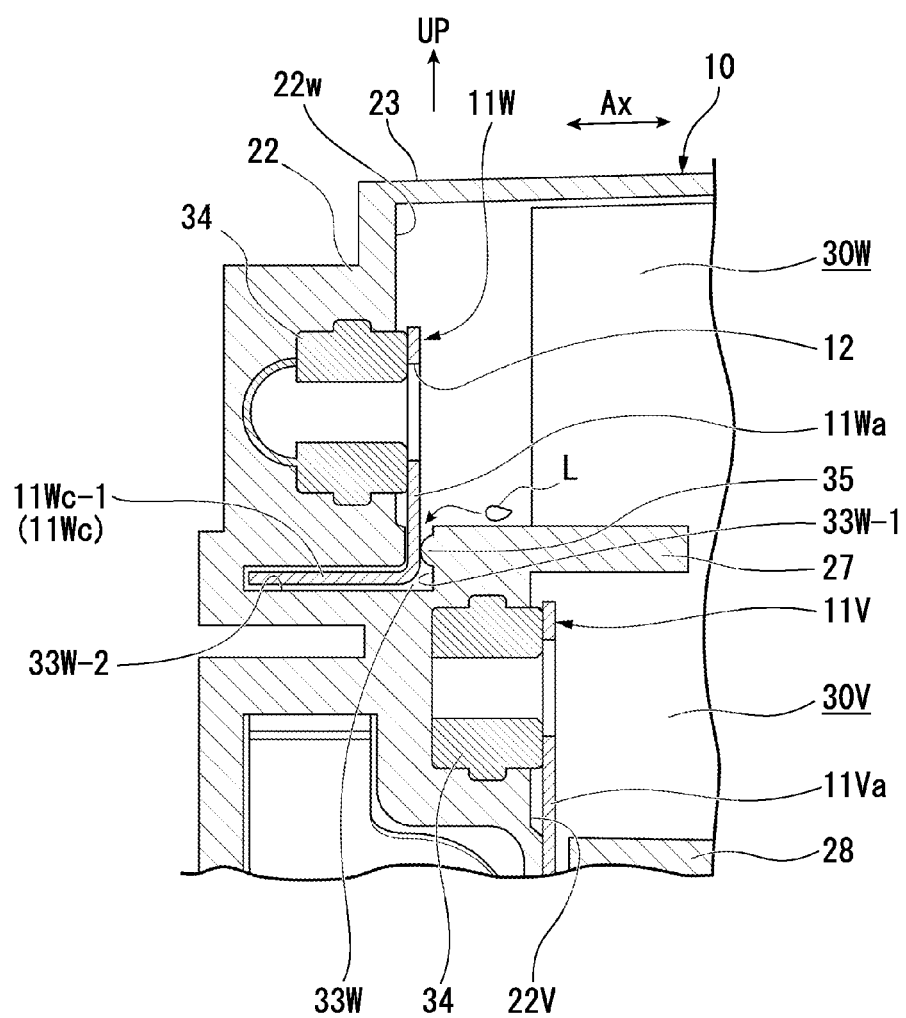
FIG. 6 is a cross-sectional view of the terminal block of the rotary electric machine according to the embodiment of the invention that corresponds to a cross-section taken along line A-A of FIG. 2.
Figure 7:
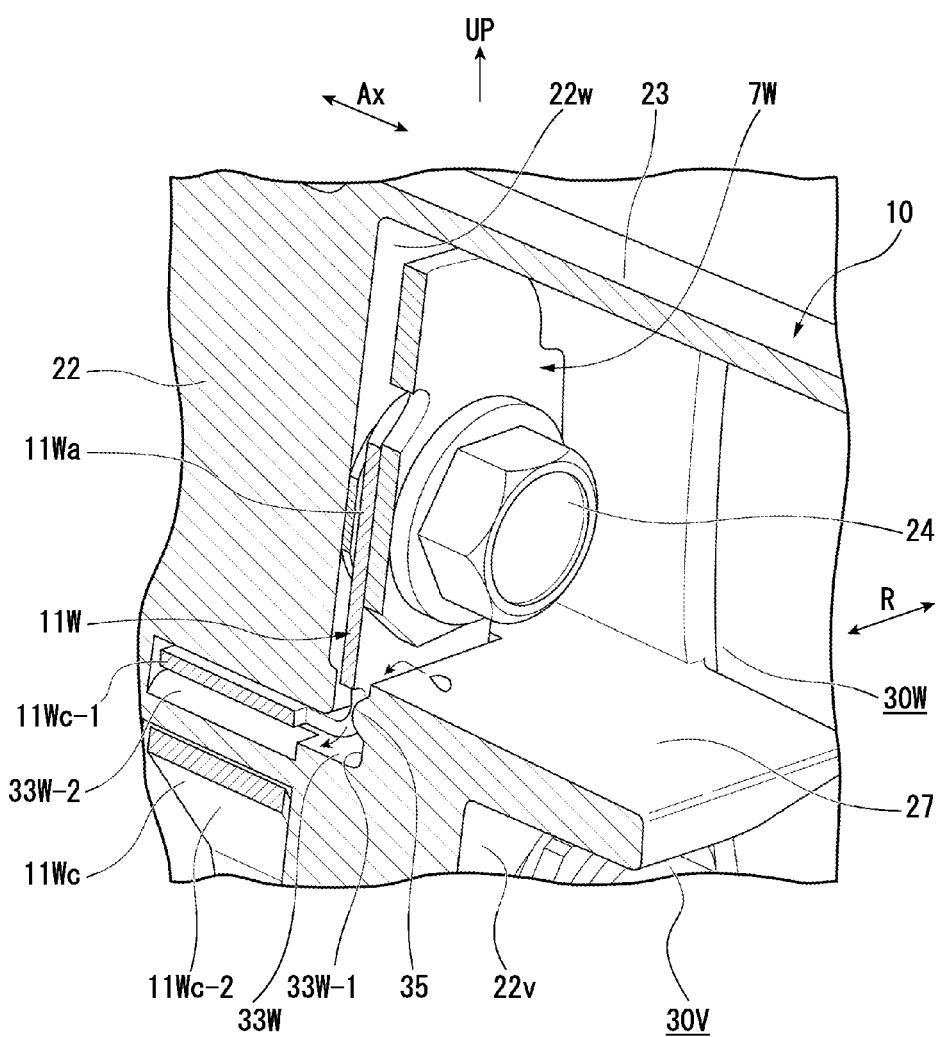
FIG. 7 is a perspective view when the terminal block of the rotary electric machine according to the embodiment of the invention is cut at a cross-sectional portion taken along line B-B of FIG. 2.
Figure 8:
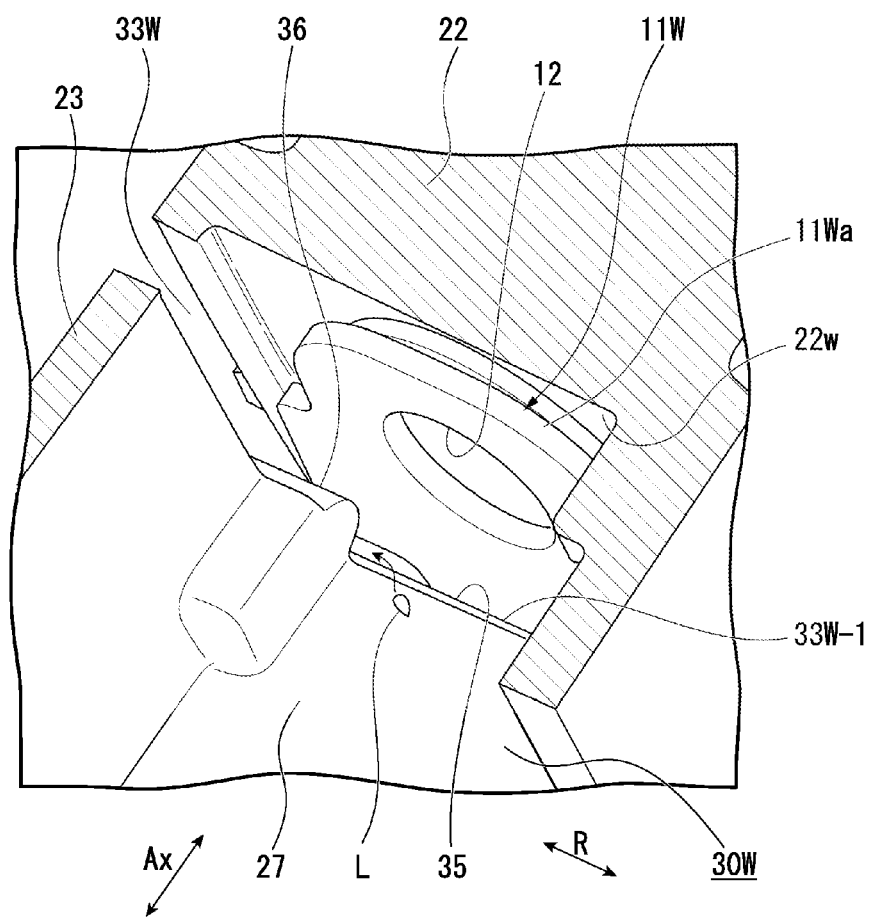
FIG. 8 is a perspective view when the terminal block of the rotary electric machine according to the embodiment of the invention is cut at a cross-sectional portion taken along line C-C of FIG. 2.
Figure 9:
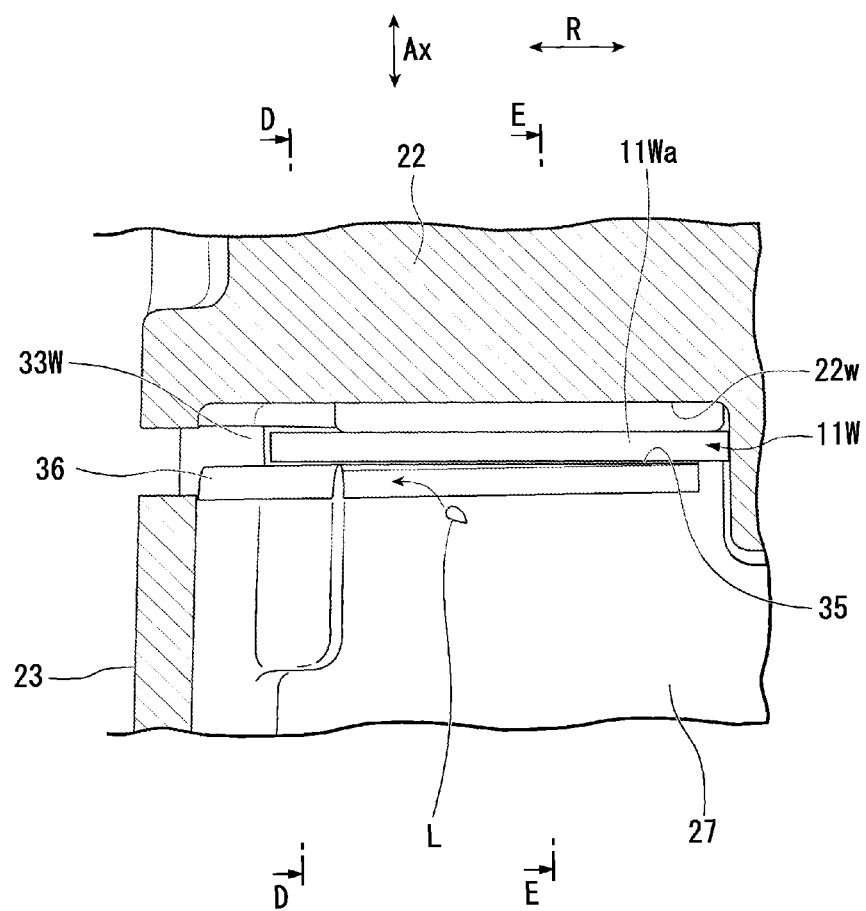
FIG. 9 is a cross-sectional view of the terminal block of the rotary electric machine according to the embodiment of the invention that corresponds to a cross-section taken along line C-C of FIG. 2.
Figure 10:
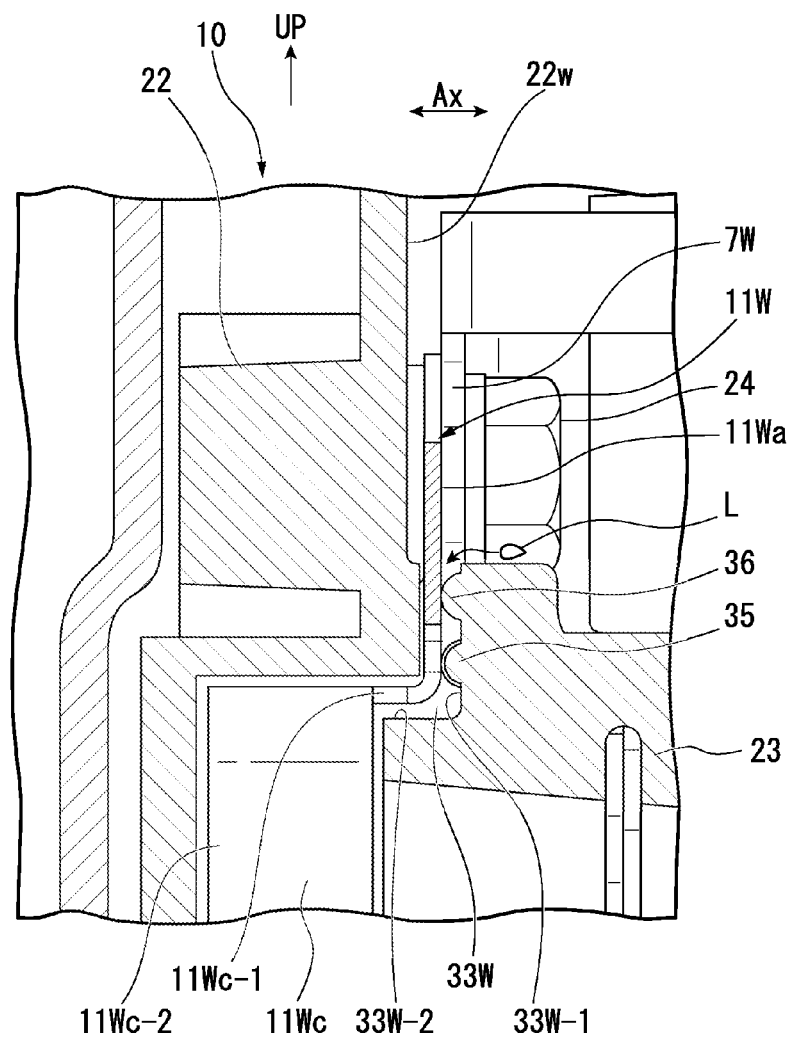
FIG. 10 is a cross-sectional view of the terminal block of the rotary electric machine according to the embodiment of the invention that corresponds to a cross-section taken along line D-D of FIG. 9.
Figure 11:
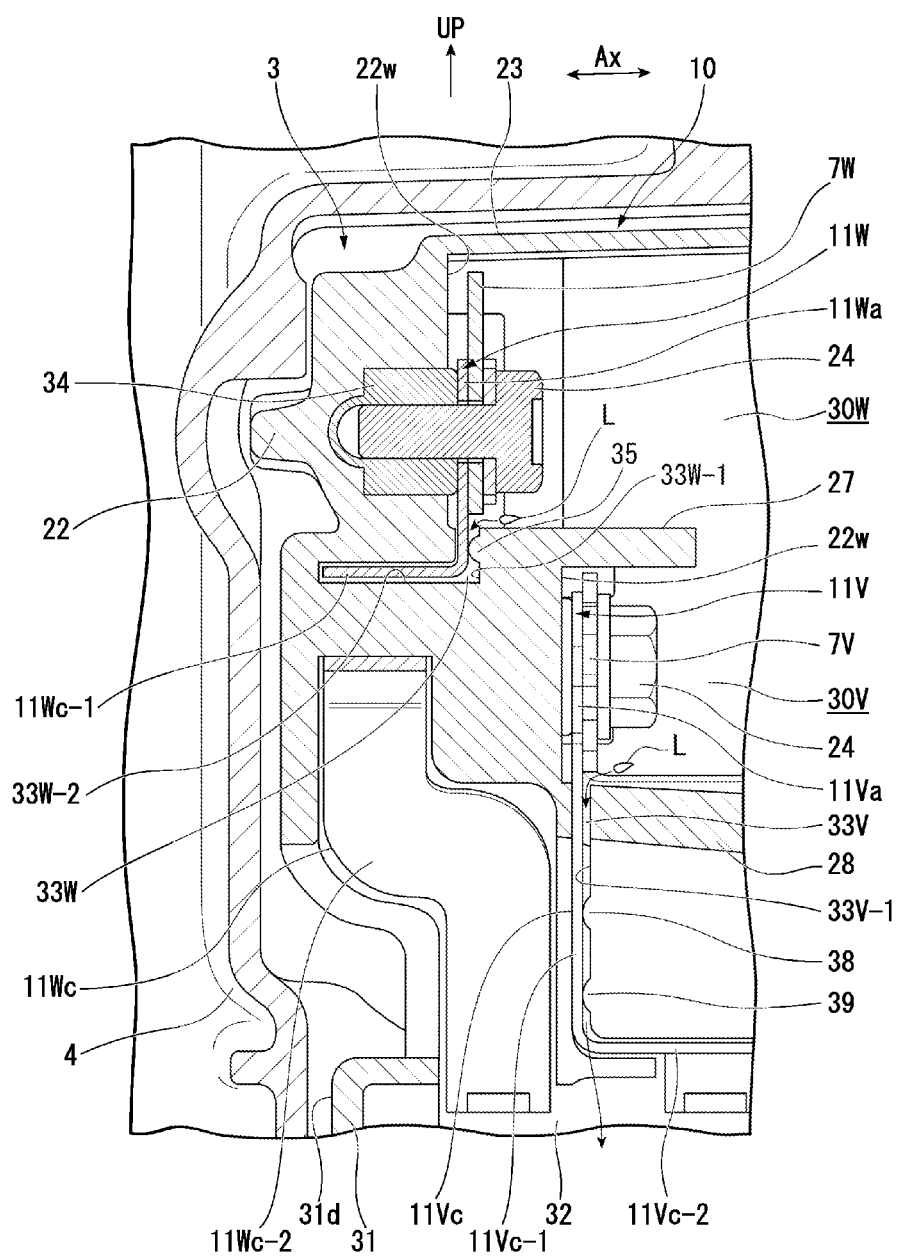
FIG. 11 is a cross-sectional view of the terminal block of the rotary electric machine according to the embodiment of the invention that corresponds to a cross-section taken along line E-E of FIG. 9.

FIGS. 6 to 11 are views showing the detail of the slits 33W and 33V and the peripheral portions thereof Meanwhile, FIGS. 7, 10, and 11 show a state in which the power supply terminals 7W and 7V are joined to the bus bars 11W and 11V by the bolts 24.

As shown in FIG. 5, a bent piece 11Wc-1 of the connection wall 11Wc, which is substantially horizontally bent toward the base wall 22, of the bus bar 11W for a W phase is connected to the lower end of the connection portion 11Wa that is disposed in a vertical attitude on the front surface of the base wall 22, and a leading portion 11Wc-2 of the connection wall 11Wc, which is disposed along the outer surface of the outer wall 23, is connected to the outer end portion of the bent piece 11Wc-1 in the radial direction (R direction). The connection portion 11Wb, which is disposed in a horizontal attitude in the recessed portion 32, is connected to the lower end of the leading portion 11Wc-2.

As shown in FIG. 5, a downward extending portion 11Vc-1 of the connection wall 11Vc, which extends straight downward along the front surface of the base wall 22, of the bus bar 11V for a V phase is connected to the lower end of the connection portion 11Va that is disposed in a vertical attitude on the front surface of the base wall 22, and a leading portion 11Vc-2 of the connection wall 11Vc, which is disposed along the lower surface of the box upper wall 31a of the connector connecting portion 31, is connected to the lower end of the downward extending portion 11Vc-1.

As shown in FIGS. 2, 3, 5, and 6 to 11, the slit 33W for a W phase and the slit 33V for a V phase are formed substantially in an L shape of which the side along the vertical direction is long. The width w of each of the slits 33W and 33V is set to be larger than the thickness t of each of the bus bars 11W and 11V (w>t) (see FIG. 5).

As shown in FIGS. 6 to 11, the slit 33W for a W phase is formed over a part of the first partition wall 27 and the base wall 22 from the outer wall 23. Specifically, a vertical groove portion 33W-1 (which is opened downward from the insulation space 30W for a W phase) of the slit 33W is formed at the first partition wall 27 over an extending range, which has a predetermined length from the outer wall 23, of a boundary portion between the first partition wall and the base wall 22. Furthermore, a horizontal groove portion 33W-2 of the slit 33W is formed at the base wall 22 so as to continue to the bottom of the vertical groove portion 33W-1, and these groove portions 33W-1 and 33W-2 continue to a substantially L-shaped through-portion of the outer wall 23. Accordingly, in this embodiment, a portion, which extends over the boundary portion between the first partition wall 27 and the base wall 22 and an extension base portion of the first partition wall 27, communicates with the outside of the outer wall 23 (a space between the inner wall of the housing 4 and the outer wall 23) through the slit 33W. The connection portion 11Wa of the bus bar 11W and the bent piece 11Wc-1 of the connection wall 11Wc are inserted into the slit 33W.

Reference numeral 34 of FIGS. 6 and 11 denotes embedded nuts that are embedded into the base wall 22 to join the power supply terminals 7W and 7V to the connection portions 11Wa and 11Va of the bus bars 11W and 11V by bolts 24. Although not shown, an embedded nut, which is used to join the power supply terminal 7U to the connection portion 11Ua of the bus bar 11U by a bolt 24 likewise, is provided in a region of the base wall 22 corresponding to the insulation space 33 U.

Further, as shown in FIG. 6, the height of a W-phase bus bar installation surface 22w of the base wall 22 in the axial direction (Ax) is set to be lower than the height of a V-phase bus bar installation surface 22v in order to prevent the sufficient thickness of a peripheral portion of the embedded nut 34 for a V phase from not being ensured due to the slit 33W for a W phase.

A pair of locking protrusions 35 and 36, which pinch and fix the bus bar 11W inserted into the slit 33W between the walls of the slit 33W facing each other, are formed on a portion of the first partition wall 27 that faces the inside of the slit 33W. One locking protrusion 35 is formed within the range of the thickness of a general portion of the first partition wall 27, and the other locking protrusion 36 is formed at the extension base portion of the first partition wall 27 so as to bulge upward in the axial direction. Further, one locking protrusion 35 is formed at the terminal end portion of the slit 33W over a relatively long range in the radial direction (R direction), and the other locking protrusion 36 is formed near the outer wall 23 so as to be short in the radial direction (R direction). Further, since the other locking protrusion 36 is disposed so as to be separated upward from one locking protrusion 35 as shown in FIGS. 3, 5, and 10, a gap is ensured between both the locking protrusions 35 and 36 in a vertical direction.

Accordingly, while the bus bar 11W is installed in the slit 33W, a gap through which the upper surface of the first partition wall 27 and the outside of the outer wall 23 communicate with each other is ensured between a slit forming portion and the bus bar 11W. For this reason, when a coolant L, which is supplied to the stator 1 during the operation, enters the insulation space 30W of the terminal block 3, the coolant L is discharged to the outside of the outer wall 23 through the slit 33W.

Meanwhile, the connection portion 11Wa and the bent piece 11Wc-1 of the bus bar 11W are inserted into the slit 33W of the outer wall 23 along the radial direction (R direction) in a direction substantially orthogonal to the thickness direction.

As described above, the slit 33W includes an insertion opening through which the bus bar 11W (relay conductor) is inserted into the terminal block body 10 from the outside of the terminal block body 10, and a conductor receiving portion in which the bus bar 11W is received between the base wall 22 and the first partition wall. The thickness of the bus bar 11W is smaller than the width of the conductor receiving portion at least as a part of the conductor receiving portion. That is, the conductor receiving portion includes a portion of which the width is larger than the thickness of the relay conductor.

As shown in FIGS. 3, 5, and 11, the slit 33V for a V phase is formed over a part of the second partition wall 28 and the box upper wall 31a from the outer wall 23. The slit 33V is opened to the vertically lower side from the insulation space 30V for a V phase. The connection portion 11Va of the bus bar 11V and the downward extending portion 11Vc-1 of the connection wall 11Vc are inserted into the slit 33V.

Further, as shown in FIG. 2, an auxiliary partition wall 37, which electrically insulates the downward extending portion 11Vc-1 of the bus bar 11V inserted into the slit 33V from the connection portion 11Ua of the adjacent bus bar 11U, is formed between the lower surface of the second partition wall 28 of the terminal block 3 and the box upper wall 31a. The auxiliary partition wall 37 is also integrally joined to the front surface of the base wall 22, but a vertical groove portion 33V-1 (see FIG. 11), which forms a part of the slit 33V is formed at a boundary between the base wall 22 and the auxiliary partition wall 37. A pair of locking protrusions 38 and 39, which pinch and fix the bus bar 11V inserted into the slit 33V between the walls of the slit 33V facing each other, are formed on the wall close to the vertical groove portion 33V-1.

The bus bar 11V is held in the slit 33V by the locking protrusions 38 and 39, but a gap is formed between the bus bar 11V and a slit forming portion. Accordingly, when a coolant L for cooling the stator 1 enters the insulation space 30V of the terminal block 3, the coolant L is discharged to the outside of the outer wall 23 through the slit 33V.

Meanwhile, the connection portion 11Va and the downward extending portion 11Ac-1 of the bus bar 11V are inserted into the slit 33V along the radial direction (R direction) in a direction substantially orthogonal to the thickness direction.

Next, the bus bar 11U and the slit 33U for a U phase will be described.

As shown in FIG. 5, the connection wall 11Uc of the bus bar 11U for a U phase is formed and bent at a lower end of the connection portion 11Ua, which is close to coils and is disposed in a vertical attitude on the front surface of the base wall 22, so as to be along the upper surface of the third partition wall 29. The connection wall 11Uc is formed so as to have the shape of a crank in a plan view, and the connection portion 11Ub close to the power supply line is connected to an end portion of the connection wall 11Uc opposite to the connection portion 11Ua so as to be inclined at a set angle.

As shown in FIGS. 2, 3, and 5, the slit 33U for a U phase is formed over a part of the box end wall 31c and the box side wall 31b. The slit 33U is formed substantially horizontally along the axial direction (Ax direction), and the width w of the slit 33U is set to be larger than the thickness t of the bus bar 11U (w>t) like the widths of the other slits 33W and 33V (see FIG. 5). Further, the third partition wall 29, which partitions the lower end of the insulation space 30U for a U phase, is formed so as to be inclined downward toward the box side wall 31b, and the slit 33U for a U phase is formed at a position that is adjacent to a connection portion of the box side wall 31b connected to the third partition wall 29. Accordingly, the slit 33U for a U phase is also opened substantially downward in a vertical direction from the insulation space 30U for a U phase.

Meanwhile, a part of the connection portion 11Ua and the connection wall 11Uc, which are close to the power supply lines, of the bus bar 11U for a U phase are inserted into the slit 33U along the axial direction (Ax direction) in a direction substantially orthogonal to the thickness direction.

A gap is ensured between the bus bar 11U inserted into the slit 33U and a slit forming portion. For this reason, a coolant L, which enters the insulation space 30U of the terminal block 3, is discharged to the outside of the outer wall 23 through the gap.

Figure 12:
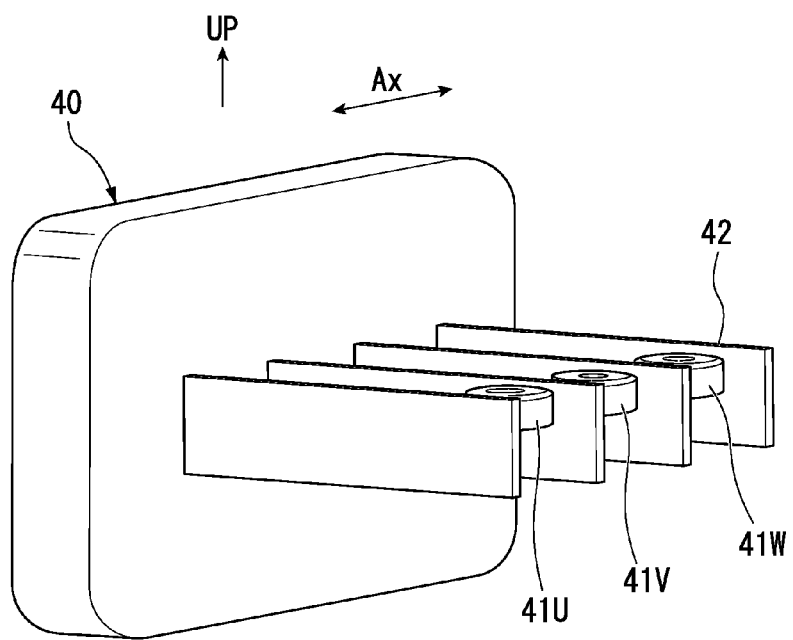
FIG. 12 is a perspective view of a connector for connecting power supply lines that are connected to the terminal block of the rotary electric machine according to the embodiment of the invention.
Figure 13:
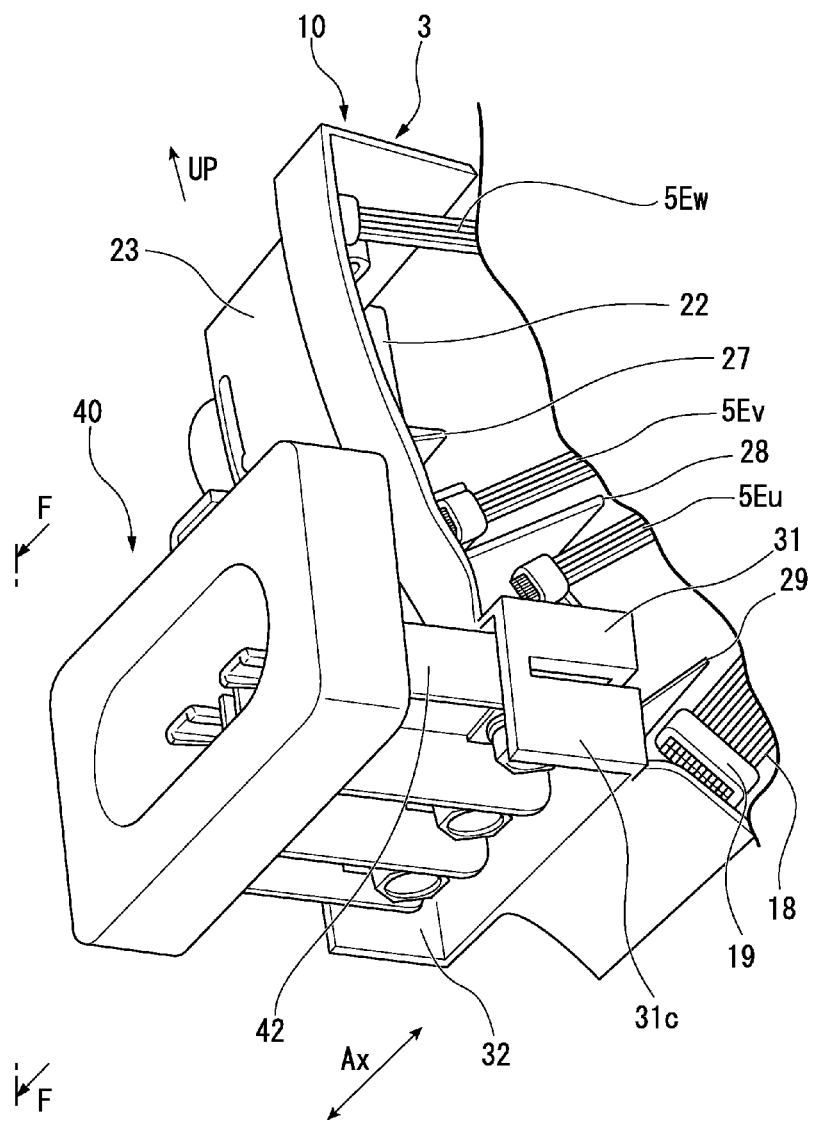
FIG. 13 is a perspective view showing a state in which the connector is connected to the terminal block of the rotary electric machine according to the embodiment of the invention.
Figure 14:
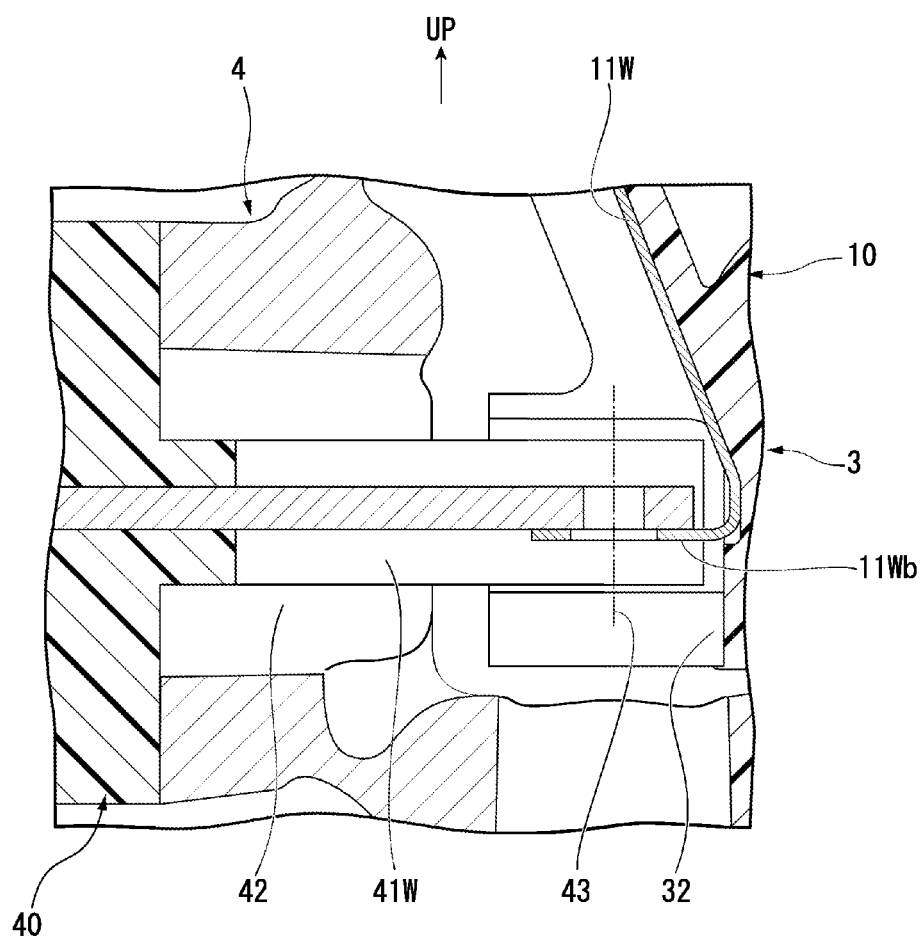
FIG. 14 is a cross-sectional view of the rotary electric machine according to the embodiment of the invention that corresponds to a cross-section taken along line F-F of FIG. 13.

FIG. 12 is a view showing a connector 40 that is installed on the side surface of the lower end of the housing 4 and connects external power supply lines (not shown) to the bus bars 11U, 11V, and 11W of the terminal block 3. FIGS. 13 and 14 are views showing a state in which the connector 40 is connected to the terminal block 3.

The connector 40 includes three terminals 41U, 41V, and 41W that are connected to external power supply lines for three phases, that is, a U phase, a V phase, and a W phase, and guide walls 42 that surround these terminals 41U, 41V, and 41W. The guide walls 42 and end portions of the respective terminals 41U, 41V, and 41W are inserted into the connector connecting portion 31 of the terminal block 3. The end portions of the respective terminals 41U, 41V, and 41W, which are inserted into the connector connecting portion 31, are joined to the connection portions 11Ub, 11Vb, and 11Wb of the corresponding bus bars 11U, 11V, and 11W by bolts 43.

As described above, in the rotary electric machine according to this embodiment, the periphery of connection portions between the respective bus bars 11U, 11V, and 11W, which are disposed on the base wall 22 of the terminal block 3, and the power supply terminals 7U, 7V, and 7W, or the midpoint connecting portion 18 is surrounded by the outer wall 23 and at least any one of the first partition wall 27, the second partition wall 28, and the third partition wall 29. For this reason, it is possible to reliably maintain a state in which the connection portion for each phase or the midpoint connecting portion 18 is insulated from peripheral members, such as adjacent connection portions or the housing 4.

Further, in this rotary electric machine, the slits 33W, 33V, and 33U, which make the root portions of the first partition wall 27, the second partition wall 28, and the third partition wall 29 communicate with the outside of the outer wall 23, are formed at the outer wall 23 of the terminal block 3. For this reason, it is possible to promptly discharge the coolant, which is used to cool the stator and enters the inside of the terminal block 3, to the outside of the terminal block 3 from the upper sides of the respective partition walls 27, 28, and 29 through the slits 33W, 33V, and 33U. Accordingly, it is possible to prevent impurities, which are mixed with the coolant, from being accumulated around the connection portion for each phase that is disposed on the terminal block 3. In particular, since the coolant containing impurities flows into the slit by gravity when the slit is opened to the vertically lower side, it is possible to more effectively suppress the accumulation of the impurities around the connection portion.

In this rotary electric machine, the bus bars 11U, 11V, and 11W are installed in the respective slits 33U, 33V, and 33W that are formed on the terminal block 3. Accordingly, the respective bus bars 11U, 11V, and 11W are formed so as to have a thickness smaller than the width of each of the slits 33U, 33V, and 33W, and are inserted into the respective slits 33U, 33V, and 33W in the direction substantially orthogonal to the thickness direction. For this reason, it is possible to reliably discharge the coolant or impurities, which enter the inside of the terminal block 3, to the outside through the gaps between the respective bus bars 11U, 11V, and 11W and the slit forming portions of the terminal block 3.

Also, in the case of this rotary electric machine, the bus bars 11U, 11V, and 11W made of metal are not molded in the terminal block body 10 made of a resin, and the bus bars 11U, 11V, and 11W, which are thinner than the slits 33U, 33V, and 33W, are inserted and installed in the slits 33U, 33V, and 33W formed at the terminal block body 10. For this reason, even though relative displacement between the bus bars and the terminal block body occurs at the time of a temperature change due to a difference between the coefficient of linear expansion of the bus bars 11U, 11V, and 11W made of metal and the coefficient of linear expansion of the terminal block body 10 made of a resin, it is possible to reliably absorb the relative displacement by the gaps between the respective bus bars 11U, 11V, and 11W and the slit forming portions. Accordingly, in this rotary electric machine, it is possible to prevent unnecessary stress from being generated in the terminal block body 10.

Many bent portions or curved portions are formed in this embodiment, so that the respective bus bars 11U, 11V, and 11W flexibly correspond to the shapes or layout of other peripheral parts such as the housing 4. When many bent portions or curved portions are formed at the bus bars 11U, 11V, and 11W as described above, large relative displacement easily occurs between the bus bars 11U, 11V, and 11W made of metal and the terminal block body 10 made of a resin at the time of a temperature change. Accordingly, the structure of the terminal block 3, which includes gaps at the slits 33U, 33V, and 33W of the terminal block body 10 to receive the corresponding bus bars 11U, 11V, and 11W, is particularly effective when the bus bars 11U, 11V, and 11W including bent portions or curved portions are employed as in this embodiment.

Further, in the rotary electric machine according to this embodiment, a direction in which the bus bar 11U is inserted into the slit 33U of the terminal block body 10 is different from the directions in which the other bus bars 11W and 11V are inserted into the corresponding slits 33W and 33V. For this reason, the connection portion 11Ua, which is close of the coil, of the bus bar 11U can be easily set to substantially the same height as the connection portions 11Wa and 11Va of the other bus bars 11W and 11V on the base wall 22 of the terminal block body 10.

The structure of this rotary electric machine is advantageous in reducing the size of the terminal block 3, eventually, reducing the size of the entire machine.

The invention is not limited to the above-mentioned embodiment, and may have various modifications in design without departing from the scope of the invention.

INDUSTRIAL APPLICABILITY

According to the invention, connection portions, which are to be connected to the coil conductor wires, of the respective relay conductors, which are disposed on the base wall, are surrounded by the base wall, the outer wall, and the partition walls. Accordingly, it is possible to maintain a state in which the connection portions are insulated from the surroundings. Moreover, it is possible to discharge a coolant, which enters the inside of the terminal block, to the inner wall of the housing from a connection space portion, which is formed in the terminal block, through the slits. For this reason, it is possible to prevent impurities, which are mixed with the coolant, from being accumulated around the connection portions that are disposed on the terminal block. As a result, it is possible to maintain an insulating property between the connection portions, which are disposed on the terminal block, for a long period of time.

DESCRIPTION OF THE REFERENCE SYMBOLS

1: stator
3: terminal block
4: housing
5: coil conductor wire
10: terminal block body
11U, 11V, 11W: bus bar (relay conductor)
11Ua, 11Va, 11Wa: connection portion
22: base wall
23: outer wall
27: first partition wall (partition wall)
28: second partition wall (partition wall)
29: third partition wall (partition wall)
30U, 30V, 30W: insulation space (connection space portion)
33U, 33V, 33W: slit

The invention claimed is:
1. A rotary electric machine comprising:
a stator around which coil conductor wires for a plurality of phases are wound;
a housing that contains the stator; and
a terminal block that is mounted on the housing and connects end portions of the coil conductor wires for the respective phases led from the stator to corresponding external power supply lines,
wherein a coolant is supplied to the stator in the housing,
the terminal block includes: a plurality of relay conductors, each relay conductor having one end connected to an external power supply line and an other end connected to an end portion of the coil conductor wires for the respective phases, and a terminal block body that is made of an insulating material and holds the plurality of relay conductors, and
the terminal block body includes: a base wall on which connection portions between the respective relay conductors and the end portions of the corresponding coil conductor wires are disposed so as to be separated from each other; an outer wall that is disposed between an inner wall of the housing and the connection portions disposed on the base wall so as to be along an end edge of the base wall; a plurality of partition walls that extend from the outer wall or the base wall and insulate peripheral portions of the connection portions together with the outer wall; a connection space portion that is surrounded by the base wall, the outer wall, and the plurality of partition walls and contains the connection portions; and slit through which the connection space portion communicates with the inner wall of the housing.

2. The rotary electric machine according to claim 1, wherein the slit is opened to the vertically lower from the connection space portion.

3. The rotary electric machine according to claim 1, wherein each of the relay conductors includes a plate-shaped portion that has a constant thickness smaller than a width of the slit, and the plate-shaped portion is inserted into the slit in a direction orthogonal to a thickness direction.

4. The rotary electric machine according to claim 3, wherein the plate-shaped portions are provided with one of bent portions and curved portions.

5. The rotary electric machine according to claim 4, wherein a direction in which the plate-shaped portion of one relay conductor among the plurality of relay conductors is inserted into the slit is different from directions in which the plate-shaped portions of other relay conductors are inserted into the corresponding slit.

6. The rotary electric machine according to claim 3, wherein a direction in which the plate-shaped portion of one relay conductor among the plurality of relay conductors is inserted into the slit is different from directions in which the plate-shaped portions of the other relay conductors are inserted into the corresponding slit.

7. A rotary electric machine comprising:

a stator around which coil conductor wires for a plurality of phases are wound;

a housing that contains the stator; and a terminal block that is mounted on the housing and connects end portions of the coil conductor wires for the respective phases led from the stator to corresponding external power supply lines, wherein a coolant is supplied to the stator in the housing, the terminal block includes: a plurality of relay conductors, each relay conductor having one end connected to an external power supply line and an other end connected to an end portion of the coil conductor wires for the respective phases, and a terminal block body that is made of an insulating material and holds the plurality of relay conductors, and the terminal block body includes: a base wall on which connection portions between the respective relay conductors and the end portions of the corresponding coil conductor wires are disposed so as to be separated from each other; partition walls that are formed on the base wall so as to be provided upright in a direction crossing the base wall and partition the respective connection portions; and slit that includes insertion openings and conductor receiving portions, the relay conductors being inserted into the terminal block body from the outside of the terminal block body through the insertion openings, the conductor receiving portions being formed between the base wall and the partition walls.

8. The rotary electric machine according to claim 7, further comprising:

an outer wall that is disposed between an inner wall of the housing and the connection portions disposed on the base wall so as to be along an end edge of the base wall; and a connection space portion that is surrounded by the base wall, the outer wall, and the partition walls and receives the connection portions, wherein the slit makes the connection space portion communicate with the inner wall of the housing.

9. The rotary electric machine according to claim 7, wherein the slit is opened to the vertically lower side of the connection portions.

10. The rotary electric machine according to claim 9, wherein each of the relay conductors includes a plate-shaped portion that has a constant thickness smaller than a width of the slit, and the plate-shaped portion is inserted into the slit in a direction orthogonal to a thickness direction.

11. The rotary electric machine according to claim 10, wherein the plate-shaped portions are provided with one of bent portions and curved portions.

12. The rotary electric machine according to claim 9, wherein the conductor receiving portion includes a portion of which the width is larger than the thickness of the relay conductor.

13. The rotary electric machine according to claim 7, wherein each of the relay conductors includes a plate-shaped portion that has a constant thickness smaller than a width of the slit, and the plate-shaped portion is inserted into the slit in a direction orthogonal to a thickness direction.

14. The rotary electric machine according to claim 13, wherein the plate-shaped portions are provided with one of bent portions and curved portions.

15. The rotary electric machine according to claim 7, wherein the conductor receiving portion includes a portion of which the width is larger than the thickness of the relay conductor.

\* \* \* \* \*